Aug. 7, 1951                J. BURNHAM ET AL                2,563,307
HIGH DIELECTRIC CERAMIC MATERIAL AND METHOD OF MAKING
Filed June 14, 1944

INVENTORS.
PRESTON ROBINSON
JOHN BURNHAM &
ARTHUR JAMES DIPPOLD
BY
ATTORNEY

Patented Aug. 7, 1951

2,563,307

UNITED STATES PATENT OFFICE 2,563,307

HIGH DIELECTRIC CERAMIC MATERIAL AND METHOD OF MAKING

John Burnham, Williamstown, Arthur James Dippold, North Adams, and Preston Robinson, Williamstown, Mass., assignors to Sprague Electric Company, North Adams, Mass., a corporation of Massachusetts Application June 14, 1944, Serial No. 540,270

7 Claims. (Cl. 106—39)

This invention relates to improved ceramic materials, and more particularly refers to ceramic materials of high dielectric constant suitable for use in electrical condensers.

It is well known that barium titanate, strontium titanate, lead titanate and certain other titanates or mixtures of these compounds possess unusually high dielectric constants. Unfortunately, however, when condensers using such substances as dielectrics are subjected to variations in temperature and/or frequency, the dielectric constant of the ceramic and the power factor of the condenser undergo extensive changes, frequently amounting to two or three hundred per cent of their value at room temperature. With an increase of temperature, say, from 0° C. to 100° C., the value of the dielectric constant may ascend rapidly to a peak and then rapidly descend to a relatively constant value. Further the power factor over the same range may decrease sharply and then increase. These factors render such ceramic condensers unsatisfactory except for use in a very limited range of temperature. However, this is a virtual impossibility in actual operation since the atmospheric temperature itself will generally vary at least ten or twenty degrees in a single day. Nevertheless, the sturdiness and durability of ceramic materials and condensers made therefrom are desirable. Further, the high dielectric constant and the resulting small volume of titanate ceramic condensers are valuable in electrical circuits, if the foregoing susceptibility to temperature and freuency changes could be overcome.

It is an object of this invention to produce new dielectric compositions. It is a further object to produce new ceramic dielectric compositions which are not subject to the foregoing and related disadvantages of prior ceramic dielectric compositions. It is a further object to provide new titanate ceramic dielectrics which possess negligible temperature and electrical frequency coefficients of dielectric constant and power factor. A further object is to produce a mixture of titanates which possesses unusually high dieletric constant and negligible power factor. A still further object of this invention is to produce electrical condensers possessing high capacity values, high breakdown voltages, unusual physical and chemical stability as well as low power factor and small size. It is a further object of this invention to produce ceramic condensers which possess negligible temperature and frequency coefficients of capacity and electrical loss. Additional objects will become apparent from a consideration of the following description and claims.

In accordance with the present invention these objects are attained by the use of certain mixtures of titanates and in some cases other ceramic compounds. In a more restricted sense this invention is concerned with ceramic dielectric compositions composed of incompletely sintered particles of various titanate compounds. In a still more restricted sense this invention is concerned with novel ceramic compositions produced by sintering the surfaces only of particles of a mixture of barium, strontium, magnesium and/or other titanate solid solutions. The invention is also concerned with electrical condensers produced by applying electrically-conducting surfaces or electrodes on parallel and/or opposite surfaces of the ceramic compositions of this invention. The invention is further concerned with the use of certain addition agents which have a profound effect on the melting or sintering temperatures as well as the electrical and physical properties of the final ceramic composition.

It has been found that by employing mixtures of titanates in powdered form and heating such mixtures to temperatures sufficient only to sinter the particles together without causing them to coalesce and form a solid solution, the resulting ceramic will have greatly reduced temperature and electrical frequency coefficients of dielectric constant. As stated, the mixtures are not heated to temperatures which would cause formation of a homogeneous solid solution, either vitreous or crystalline. By the expedient of fusing only the surfaces of particles of the mixture, novel compositions with superior dielectric properties are obtained.

This invention is concerned primarily with the use of mixtures of barium, strontium, magnesium and lead titanates, but other titanates may be used in like manner and with satisfactory results. Other titanates which may be used successfully are copper titanate, calcium titanate and, in general, titanates of elements of group II of the periodic table, the second sub-group of group I of the periodic table, the first sub-group of group III of the periodic table, and/or the first sub-group of group IV of the periodic table. It is to be understood that mixtures of two or more of the aforesaid titanates are treated and employed as hereinafter described.

In accordance with this invention two or more homogeneous solid solutions of dissimilar titanate content may be ground into small particles and mixed together. Each solid solution may contain a mixture of the same titanates present in different proportions, or may contain two or more dissimilar titanates. The mixture may then be heated in a furnace to a temperature sufficient only to fuse the surfaces of the adjacent particles. Thereafter, the mixture is cooled to produce a ceramic composition of unexpectedly low coefficients of dielectric constant and power factor.

It has also been found that the dielectric compositions described above can be further enhanced by a modification of the cooling process. According to this embodiment of the invention, the mixture is cooled slowly, e. g. in the furnace, until a transition temperature has been reached and thereafter it may be cooled rapidly, e. g. in air. The transition temperature is generally between about 800° C. and about 1000° C., and, in the case of Example 1, below, 900° C. appears to be the transition point. The exact nature of the chemical and/or physical change at this point is not fully known to us, but outstanding dielectrics have been produced by cooling slowly down to, and through, this transition temperature. The slow cooling is advisably conducted in an oxidizing atmosphere.

It is to be understood that other compounds may be added to the mixture of titanates. Compounds suitable for this purpose are oxides of zinc, magnesium, barium, strontium, aluminum, silicon, lead and other elements of groups II, III, IV, V and VI in the periodic table. For example, barium oxide when incorporated in a mixture of barium titanate and strontium titanate shifts the dielectric constant peak to a higher temperature, without at the same time materially decreasing the average or overall dielectric constant. By this expedient, a slight positive temperature-capacity characteristic is obtained in a condenser manufactured from such a dielectric composition. Usually the amounts of such compounds added are small, but certain mixtures employing exact molal ratios of the oxides and the titanates have been found to produce, upon firing as aforesaid, very desirable dielectric compositions.

The particle sizes of the constituents of the mixtures should be quite fine. Improved results may generally be obtained by employing smaller particle sizes for the constituent which has, in the solid solution phase, the highest maximum dielectric constant in its temperature versus dielectric constant curve. (A curve of this type for any given solid solution may readily be prepared in the customary manner for determinations of this nature.) To illustrate the effect of particle size, a solid solution of 84% $BaTiO_2$–16% $SrTiO_2$ and a solid solution of 72% $BaTiO_2$–28% $SrTiO_2$ were ground separately. Since the second solid solution (72% $BaTiO_2$–28% $SrTiO_2$) had a higher dielectric constant peak than the first, the particles thereof were ground sufficiently to pass through a 200 mesh screen, while the first mentioned solid solution (84% $BaTiO_2$–16% $SrTiO_2$) was ground so the particles would pass through a 100 mesh screen. The dielectric composition prepared by mixing these particles and fusing only the surfaces thereof possessed appreciably smaller temperature and frequency coefficients of dielectric constant and power factor than a similar dielectric composition prepared entirely from particles ground only to 100 mesh size.

The final firing time and temperatures are dependent to a large extent upon two factors. The first is the chemical composition of the constituents mixed. For example, if two barium titanate-strontium titanate solid solutions were used, a higher final firing temperature would be required than if a mixture of two lead titanate-barium titanate solid solutions were used. The second factor is the particle sizes of the mixture. Smaller particle sizes often require lower firing temperatures. In speaking of final firing temperatures, this is meant to refer to the surface fusing of the ground mixture of two or more solid solutions. The firing temperature necessary to obtain the original solid solution is ordinarily somewhat higher.

The time of firing the mixture is roughly inversely proportional to the firing temperature, since a longer time at a lower temperature often causes the same action as a shorter time at a higher temperature. However, care must be used in selection of both the firing time and temperature, inasmuch as only the surfaces of the particles throughout the final mixture are to be fused. By substantially exceeding this temperature range, a homogeneous solid solution, vitreous or crystalline mass, would be formed, having the same chemical composition but possessing inferior dielectric qualities. In the same manner, the time should be regulated in order to avoid the foregoing disadvantages of overtreatment.

It has been found that by firing the ceramic mixtures in accordance with the instructions of this invention, the shrinkage is reduced greatly over that for a completely fused composition. This simplifies to a large degree the fabrication and manufacture of electrical condensers or other electrical products, since the number of cracked pieces is reduced and the smaller shrinkage makes the meeting of size specifications simpler.

In some cases it may be desired to conduct the final firing operation under pressure. This can be done with the same results, providing that the firing temperature and/or time is lowered accordingly. The pressure to be used is also dependent upon the particle sizes of the mixture. If pressure is to be employed during the final firing process, it is generally applied to the discs or ceramic form itself by use of a press, weights or clamps. Any suitable means for providing pressure in the furnace may be used, however. It is not necessary to use an inert atmosphere during the firing operation, nor particularly desirable, as an oxidizing atmosphere tends to maintain ceramic oxides.

For the purpose of further clarifying the invention, several examples are listed below. The first three examples illustrate the usual procedure followed in making titanate dielectric compositions. The fourth example is representative of this invention, and illustrates its surprising advantages.

Example 1

A small round disc 1″ in diameter and $\frac{3}{32}$″ thick was formed from particles of a homogeneous mixture of 72% barium titanate and 28% strontium titanate, the particles having a size smaller than 200 mesh. The so-formed disc was fired at 1340° C. for two hours and a homogeneous solid solution thus formed. The disc was allowed to cool slowly. A layer of liquid silver was painted on the parallel flat sides of the disc and firmly affixed thereto by heating to a temperature of 600° C. The electrodes thus formed were provided with wire leads and a plate condenser of two electrodes and ceramic dielectric was thereby produced.

*Example 2*

The same procedure was followed as in Example 1, but the mixture was composed of 84% barium titanate and 16% strontium titanate, the particles of said mixture being less than 200 mesh in size.

*Example 3*

The same procedure was followed as in Example 1, using a mixture of 78% barium titanate and 22% strontium titanate, the particle sizes of the mixture being less than 200 mesh.

*Example 4*

Discs made in accordance with Examples 1 and 2 were ground to particle sizes of about 200 mesh. The particles of these homogeneous solid solutions were mixed in a ratio of 50% by weight of the 72% $BaTiO_2$–28% $SrTiO_2$ particles and 50% by weight of the 84% $BaTiO_2$–16% $SrTiO_2$ particles. The mixture thus formed was pressed into disc form and surface fused only by firing at 1300° C. for one hour, cooled and then provided with electrodes as in Example 1.

*Example 5*

Same as Example 4, but the particle size of the 84% $BaTiO_2$–16% $SrTiO_2$ solution was about 100 mesh. The 72% $BaTiO_2$–28% $SrTiO_2$ particle size was 200 mesh.

*Example 6*

A disc was prepared from 325 mesh particles consisting of 83% barium titanate and 17% strontium titanate. This sample was fired as in Example 1 and provided with electrodes following cooling.

*Example 7*

A disc was prepared of 200 mesh particles consisting of 30% of particles of a 72% $BaTiO_2$–28% $SrTiO_2$ solid solution, 30% of particles of a 98% $BaTiO_2$–2% $SrTiO_2$ solid solution, and 40% of particles of an 80% $BaTiO_2$ and 20% $SrTiO_2$ solid solution. The overall chemical percentages of constituents was 83.2% $BaTiO_2$ and 16.8% $SrTiO_2$. It was fired, cooled and a condenser produced as in Example 4.

Reference to the appended drawings will clarify the results of the tested examples in which.

Figure 3A:
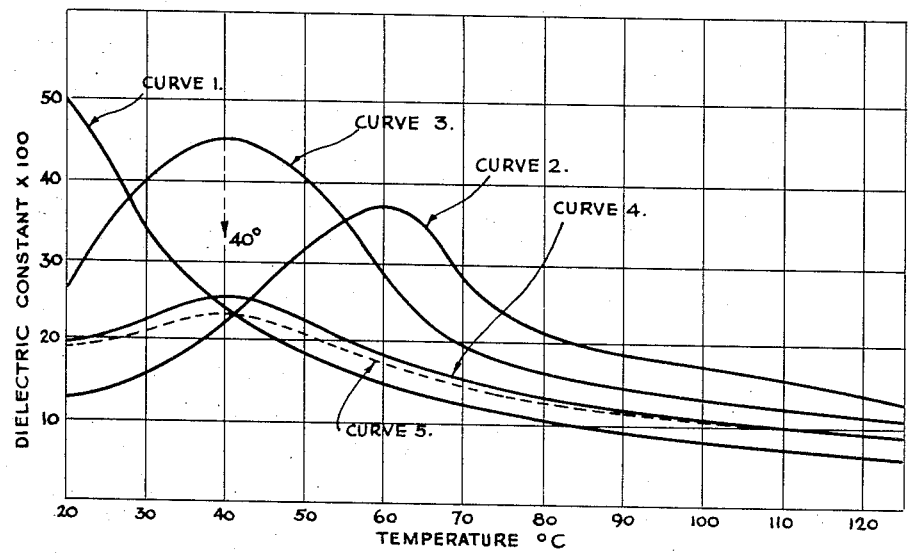
Figure 3B:
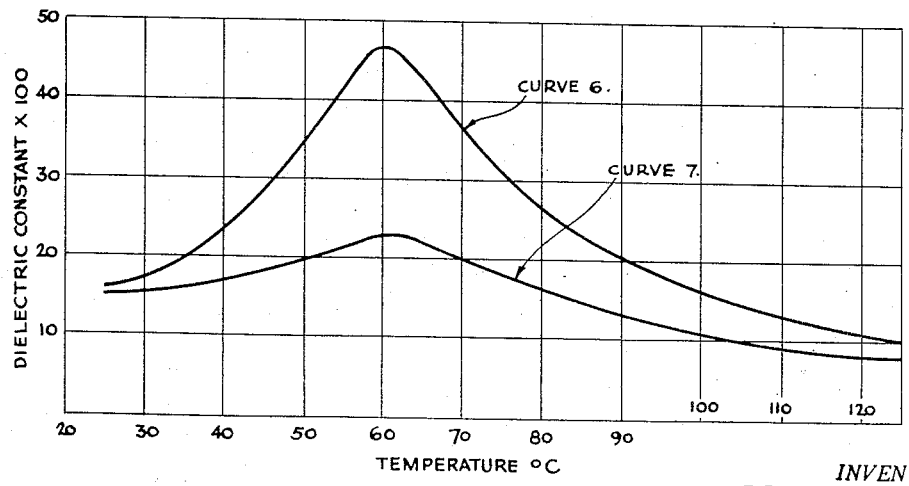

Figures 3-A and 3-B illustrate the curves obtained by plotting the dielectric constant versus the temperature for the condensers made by Examples 1 to 7 inclusive.

Figure 1:
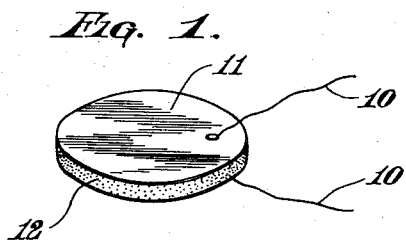
Figure 1 illustrates a completed disc, with electrical leads.

Referring more specifically to Figure 1, 12 is the ceramic disc formed by the foregoing examples. 11 is the metallic silver layer which acts as an electrode. 10 are the wire leads which are soldered or otherwise affixed to the silver layers 11.

Figure 2:
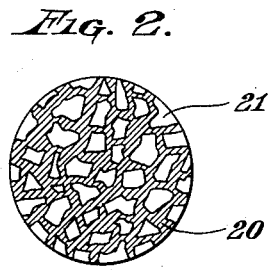
Figure 2 illustrates a highly magnified cross-section of the mass formed in Example 4.

Referring to Figure 2, 20 is the fused section of the particle surfaces, while 21 represents an unfused particle, i. e. a homogeneous solid solution. The unfused particles, 21, are composed of different solid solutions, as heretofore pointed out.

Referring to Figure 3, curve 1 represents the condenser of Example 1 and shows the low temperature high peak of a 72% $BaTiO_2$–28% $SrTiO_2$ solid solution. The large variation in dielectric constant over the range indicated makes such a composition unsatisfactory as a condenser dielectric.

Curve 2 is illustrative of the condenser of Example 2 and illustrates the lower peak value of 84% $BaTiO_2$–16% $SrTiO_2$ occurring at about 60° C. Here again the percentage change of dielectric constant over a normal operating temperature range is highly unsatisfactory.

Curve 3 is illustrative of the condenser of Example 3 and shows the intermediate peak between curves 1 and 2, which would be expected by virtue of the intermediate chemical composition. This ceramic is also unsatisfactory in spite of its high dielectric constant, because of the large variation in dielectric constant.

Curve 4 illustrates the condenser of Example 4, which is chemically the same as that of Example 3, but is totally dissimilar in its internal structure in that there are particles of two different homogeneous solid solutions, the surfaces only of these particles being fused together to yield substantially a non-porous, hard ceramic material. However, with only surface fusion, a homogeneous solid solution throughout the mass is not formed as in the first three examples.

Curve 4 is relatively flat, with an allowable percentage variation in dielectric constant over the temperature range. Therefore it is quite satisfactory for use as a dielectric in condenser construction. It will be noted that through the temperature range illustrated up to a temperature value of 110° C., a high operational temperature, the dielectric constant of the material illustrated in curve 4 has a value in excess of 1000. Other dielectric compositions having a dielectric constant over 1500 prepared in accordance with the present invention are equally advantageous.

Curve 5 is illustrative of the condenser of Example 5. It is slightly flatter than curve 4 and the percentage variation of the dielectric constant over the temperature range is smaller. This may be attributed to the particular selection of particle sizes described in Example 5. By using a smaller particle size for the 72% $BaTiO_2$–28% $SrTiO_2$ solid solution, an extremely desirable ceramic dielectric composition is attained.

Curve 6 is illustrative of the condenser of Example 6. It shows a dielectric constant peak at about 60° C., an increase of about 250% over the values of 30° C. and 100° C. This curve is similar to curve 2.

Curve 7 is illustrative of the condenser of Example 7. The dielectric constant peak is not pronounced and the relative change is small. This curve illustrates the use of a tri-particle component system. This invention also contemplates the preparation of four, five, etc. particle component systems.

Examples 4, 5 and 7 illustrate the profound improvement obtained by preparing dielectric compositions in accordance with the present invention. Although chemically these compositions may be identical with those prepared by prior art methods, from the dielectric standpoint there is no comparison between the two.

The power factor at 1000 is in the range of 0.5 to 1.5% in the above examples, the higher values generally being at the lower temperatures, so that power factor decreases with temperature increases. Ceramic compositions may be produced in accordance with the invention wherein the power factor over a wide temperature range is below three-tenths of one percent and the dielectric constant averages at least 2000, with a variation of a maximum of 10% over this wide range. By following the instructions given in Example 4, it is a simple matter to produce a ceramic dielectric with an average dielectric constant of 1500 over a wide temperature range, and with the power factor, as mentioned above, not exceeding 1.5%. At radio frequencies, the power factor is generally lower than at 1000 or at other audio frequencies, as discussed above.

In speaking of a wide temperature range, reference is made to temperatures from about —55° C. or less to 150° C. or more. These are the widest normal operating ranges met in electrical condensers. However, since the dielectric constant curve is virtually flat at the extremities of this range, little change will be met beyond these extremities. It was also found that the ceramic compositions described in Examples 4, 5 and 7 possessed extremely satisfactory electrical frequency coefficients of dielectric constant and power factor. These factors are important, since electrical condensers are often subjected to both varied frequency and varied temperature, as in the case of a coupling condenser in a radio receiving set.

The ceramic compositions of this invention are particularly suited for use as dielectrics in electrical condensers. The physical characteristics thereof make possible their use in stacked plate or disc condensers, tubular and concentric type condensers, trimmer and variable condensers, as well as other related types of condensers. They are particularly useful for high voltage operation, since the breakdown strength of the ceramic is extraordinarily high. For example, a disc less than $\frac{1}{16}''$ in thickness, with silver electrodes, will stand a voltage in excess of 10,000 without breakdown, and the electrodes themselves will short first through the air gap or wax surrounding the disc, since the ceramic material does not break down.

This property makes the ceramic compositions of this invention superior to the usual rolled paper or electrolytic type condensers for high voltage operation.

The unusual durability, strength, and resistance to the action of moisture, corrosive atmospheres and the like of the ceramic compositions of the invention are additional properties of importance.

The form of electrical units using these ceramic compositions may be selected to suit the purpose thereof. Any form such as tubular, flat disc or plate, conical, spherical, etc., may be used without sacrificing the advantages of this invention.

Electrodes of sublimed or evaporated metal, sprayed metal or electrolytically deposited metal may be provided, as well as graphite or vitreous carbon resistance layers. Following application of the electrodes, waxes, resins, varnishes, etc., may be applied to protect the electrodes from corrosion, abrasion, etc.

It is possible to use finely-ground particles of the ceramic compositions of the invention as fillers for resinous or other dielectric materials. This expedient would increase the dielectric constant of the usual plastic mass and provide a satisfactory dielectric composition which could be coated on metal foil, hardened by polymerization, solvent evaporation or other means either before or after rolling of an electrical condenser. This same type of ceramic-resin composition may also be used as an impregnant for wound or rolled electrical units.

An additional embodiment of this invention concerns the use of the finely-ground ceramic compositions of this invention as inorganic refractory material in the electrophoretic wire coating processes described in copending applications, Serial No. 472,465 filed on January 15, 1943, now abandoned by S. Dorst, entitled "Electrical Insulating Layers," and Serial No. 496,978, filed on August 2, 1943, (now Patent No. 2,421,652, June 3, 1947) by P. Robinson et al., entitled "Improved Electrical Conductors." The high breakdown strength and insulation value of the refractory ceramic materials of this invention make them well suited for the wire coating process.

It is further contemplated that the dielectric materials disclosed herein may be used to improve certain properties of other inorganic dielectric material, such as titanium dioxide. For example, one fault of titanium dioxide condensers is that their voltage rating has been limited by the corona which develops at the edges of the electrodes which are in contact with both air and titanium dioxide. In the past, this fault has been overcome by thickening the dielectric at the electrode edges or by building up the metal at the edge so as to present a large radius of curvature. Both of these methods increase the bulk and expense of the condenser. The dielectric compositions of this invention may be applied to the titanium dioxide at the electrode edges, thereby overcoming this disadvantage. Another suitable method is to paint and/or to impregnate the edges and marginal space of the titanium dioxide with barium hydroxide, which, upon proper firing, would combine to form a barium titanate chemically joined to the adjacent titanium dioxide. It is to be understood that many methods could be employed to add the dielectric compositions disclosed herein to other ceramic compositions in areas which would otherwise possess a deleteriously high field strength.

It is also contemplated that ceramic dielectric compositions which are similar in electrical properties to those heretofore described may be obtained by firing barium, strontium and/or other titanate mixtures to the liquid state, so that the various titanates would be in solution, and subsequently cooling the solution through the solidifying range at a rapid enough rate to cause formation of various titanates with random distribution of the anions. The resulting ceramic, with its random distribution of titanates, rather than a true solid solution, would possess desirable electrical properties, although such properties would in general be inferior to those of the compositions previously described.

As many apparently widely different embodiments of this invention may be made without departing from the spirit and scope hereof, it is to be understood that the invention is not limited to the specific embodiments hereof except as defined in the appended claims.

What is claimed is:

1. A ceramic composition possessing an average dielectric constant over 1500, low power factor and negligible temperature and electrical frequency coefficients of dielectric constant and power factor, comprising a mixture of substantial proportions of particles of at least two dissimilar homogeneous solid solutions of barium and strontium titanate, in each of which the barium titanate predominates, said particles being substantially fused together only on the surfaces thereof.

2. A ceramic composition possessing an average dielectric constant over 1500, a low power factor and small coefficients of dielectric constant and electrical frequency, comprising a mixture of substantial proportions of particles of at least two homogeneous solid solutions of dissimilar titanate content, each of which contains at least two titanates selected from the group consisting of barium, strontium, magnesium, lead, copper and calcium titanates, the surfaces only of said particles being fused together.

3. A ceramic composition possessing a mean dielectric constant of at least 2000 and a mean audio frequency power factor of not greater than 1% over a wide temperature range, comprising a mixture of substantial proportions of particles of from two to three homogeneous solid solutions of dissimilar titanate content, each of which contains two titanates selected from the group consisting of barium, strontium, magnesium, lead, copper and calcium titanates, the surfaces only of said particles being fused together.

4. A method of producing improved dielectric compositions of average dielectric constant over 1500 and average audio frequency power factor less than 1.5% over a wide temperature range which comprises thoroughly mixing substantial proportions of particles of at least two homogeneous solid solutions of dissimilar titanate content, each of which contains at least two titanates selected from the group consisting of barium, strontium, magnesium, lead, copper and calcium titanates, and firing said mixture at a temperature and for a time sufficient to fuse together only the surfaces of said particles.

5. A ceramic composition possessing a high dielectric constant, low power factor and small temperature and electrical frequency coefficients of dielectric constant and power factor, comprising a mixture of substantial proportions of particles of at least two homogeneous solid solutions of dissimilar titanate content, each of which contains at least two different titanates selected from the group consisting of barium, strontium, magnesium, lead, copper and calcium titanates, one of said titanates in each of said solid solutions being barium titanate, the surfaces only of said particles being fused together.

6. A method of manufacture from barium and strontium titanates of a ceramic body having a high permittivity between predetermined maximum and minimum values over a desired temperature range, comprising forming from the said titanates at least two solid solutions each having proportions of the said titanates different from the proportions in any other of the said solutions and each having its maximum permittivity at a temperature different from the temperature for maximum permittivity of any other of the said solutions, each of said temperatures being within the desired temperature range, reducing the said solid solutions to powder, and combining portions of the powdered solid solutions into an integral body by heat treatment, without destroying the identities of the said solid solutions.

7. A method of manufacture of a ceramic body, comprising forming three solid solutions of barium and strontium titanates each having proportions of the said titanates different from the proportions of the other two solutions and in each of which the barium titanate predominates, reducing the said solid solutions to powder, and combining substantial proportions of each of the powdered solid solutions into an integral body by heat treatment without destroying the identities of the said solid solutions.

JOHN BURNHAM.
ARTHUR JAMES DIPPOLD.
PRESTON ROBINSON.

REFERENCES CITED

The following references are of record in the file of this patent:

UNITED STATES PATENTS

| Number | Name | Date |
| --- | --- | --- |
| 2,071,452 | Block | Feb. 23, 1937 |
| 2,098,812 | Pulfrich | Nov. 9, 1937 |
| 2,165,819 | Albers-Schonberg | July 11, 1939 |
| 2,220,765 | Hirose et al. | Nov. 5, 1940 |
| 2,235,489 | Rath | Mar. 18, 1941 |
| 2,277,733 | Wainer et al. | Mar. 31, 1942 |
| 2,277,734 | Wainer et al. | Mar. 31, 1942 |
| 2,305,327 | Thurnauer | Dec. 15, 1942 |
| 2,369,327 | Wainer | Feb. 13, 1945 |